United States Patent

Ueno et al.

[15] 3,651,424
[45] Mar. 21, 1972

[54] MODE-LOCKED PHASE-STABILIZED LASER DEVICE

[72] Inventors: Yoshito Ueno; Youichi Matsumoto, both of Tokyo, Japan

[73] Assignee: Nippon Electric Co., Ltd., Tokyo, Japan

[22] Filed: July 23, 1970

[21] Appl. No.: 57,641

[30] Foreign Application Priority Data

July 24, 1969 Japan.....................................44/58624

[52] U.S. Cl..........................................................331/94.5
[51] Int. Cl..........................................................H01s 3/10
[58] Field of Search.................................331/94.5; 350/160

[56] References Cited

UNITED STATES PATENTS 3,521,069   7/1970   DeMaria et al......................331/94.5

Primary Examiner—William L. Sikes
Attorney—Sandoe, Hopgood and Calimafde

[57] ABSTRACT

In a mode-locked laser device the phase shift of the output pulse and the mode locking signal are compared. The latter signal is controlled in response to this comparison to thereby maintain the laser output pulse in phase with the mode locking signal.

4 Claims, 4 Drawing Figures

PATENTED MAR 21 1972 3,651,424

INVENTORS
YOSHITO UENO
YOUICHI MATSUMOTO by
Sandoe, Hopgood & Calimafde
ATTORNEYS

MODE-LOCKED PHASE-STABILIZED LASER DEVICE

This invention relates generally to mode-locked lasers and, more specifically, to a laser having means for stabilizing the phase of light pulses generated by the laser.

In a gas laser, a mixture of helium-neon gas is subjected to pumping to reach a negative temperature state, whereby the population inversion of energy level is achieved. The gas mixture is disposed between two reflective mirrors which form a resonator. One of the reflective mirrors has a transparency of the order of 1 percent and serves as the output mirror. The laser output beam includes multiple transverse modes for each longitudinal mode, as well as multiple longitudinal modes for each transverse mode. This results in the interference between the various mode components due to the nonlinear property of the laser medium, and the production of undesirable spurious frequency components.

In an attempt to avoid this interference, the radius of curvature of each reflective mirror is determined so that laser oscillation is effected only in a selected transverse mode, and the diameter of the laser beam is adjusted so as to suppress the undesirable transverse modes. However, this does not fix the oscillation frequency interval peculiar to a selected longitudinal mode. As a result, undesirable oscillation frequency components are left unremoved in the laser output beam.

To overcome this difficulty, various proposals have been made, such as a mode-locked laser having an internal light modulator. In this laser, a mode locking signal is applied to the modulator. The frequency of that signal is set at the frequency interval between the spectra peculiar to a longitudinal mode to be selected. This procedure is generally designated forced mode locking. As a result of the forced mode locking, the laser generates a train of light pulses at a fixed repetition frequency equal to the mode locking signal frequency. It has, however, been found that the phase relationship between the mode-locked output light pulse and the mode locking signal changes over a period of time. This phase deviation is attributable to various factors, such as a decrease in the oscillation intensity due to a decrease in gas pressure, an increase in the internal loss due to a misalignment of the optical axes of the reflecting mirrors, and a change in the refractive index of the internal modulator. Such phase deviation causes the collapse in the synchronized state, to thereby produce unwanted noise, particularly when the laser is used in a ultrahigh speed PCM light communication system.

It is therefore an object of the invention to provide a mode-locked laser device in which the laser output pulse is always maintained in phase with the mode locking signal.

It is another object of the invention to provide a mode-locked laser device in which undesired frequency components in the laser output beam are eliminated.

It is a further object of the invention to provide a mode-locked laser device that is admirably well suited for use in an ultra high speed PCM transmission system.

In the laser device of this invention, the output light pulse train is phase compared with the mode locking signal. The phase of the mode locking signal is controlled in response to the result of the phase comparison, and is then applied to the internal modulator so that the output light pulse may be brought in phase with the mode locking signal. As a result, the output light pulse is always maintained in phase with the mode locking signal.

To the accomplishment of the above and to such further objects as may hereinafter appear, the present invention relates to a mode-locked phase-stabilized laser device substantially as defined in the appended claims, and as described in the following specification taken together with the accompanying drawings in which:

Figure 1:
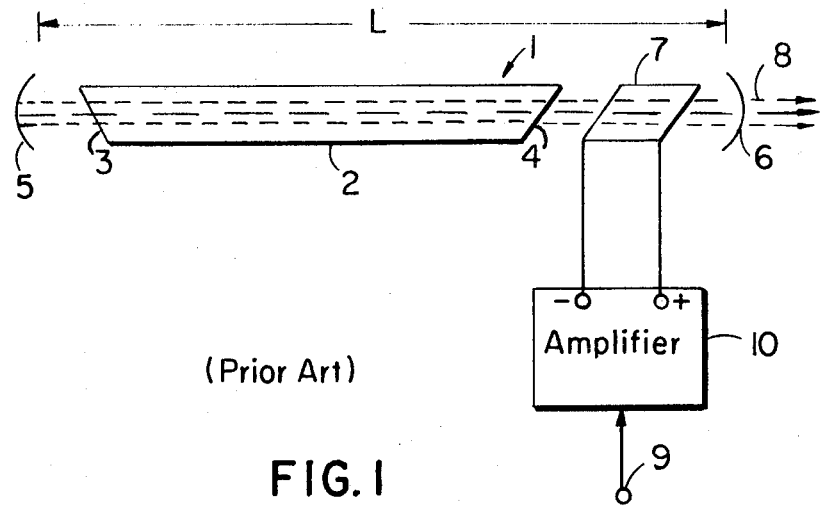
FIG. 1 is a schematic diagram of a conventional laser device utilizing forced mode locking.

In the prior art embodiment shown in FIG. 1, a laser generally designated 1 includes a laser tube 2 containing, for example, a helium-neon gas mixture. Windows 3 and 4 are formed at Brewster's angle at both ends of laser tube 2, and reflecting mirrors 5 and 6 are disposed at both ends of laser tube 2 and respectively face windows 3 and 4. An internal light modulator 7, made of an electro-optical element such as a KDP crystal, is disposed between reflecting mirror 6 and laser tube 2. The laser when suitably actuated by suitable means (not shown) generates a light beam which is indicated in FIG. 1 by the dotted line 8.

A mode locking signal is applied from a terminal 9 to a modulator 7, after being amplified at a power amplifier 10. The structure and manner of operation of the electro-optical effect modulator are well known to those having ordinary skill in this technical field and will therefore not be further described herein. Stated briefly, modulator 7 serves as a switching means for the light beam, based on the rotary and linear polarization such as described in U.S. Pat. No. 3,467,915.

Figure 3:
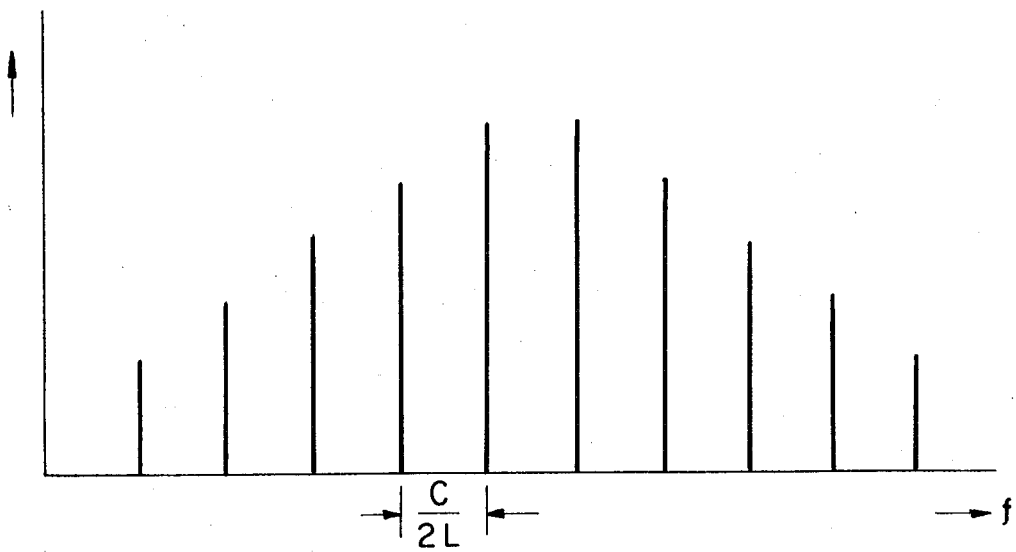
FIG. 3 illustrates the frequency spectrum of the output of the laser device of FIG. 1.

The principles of mode locking will now be briefly described. Assuming that the spacing between mirrors 5 and 6 is L and that the laser is operating in a plurality of longitudinal modes coexistent in a single transverse mode, the laser output will have the spectra as shown in FIG. 3, in which the frequency spacing between the frequency components is defined by $c/2L$ (wherein $c$ is the speed of light). This shows that a single light pulse is reciprocated between the two reflecting mirrors at the light velocity $c$, and the output is produced every time the single light pulse reaches the reflecting mirror on the output side.

When a mode locking signal having a frequency of $c/2L$ is applied to the modulator to modulate the loss of the resonator, those frequency components surrounding the desirable mode components are forced to join the mode components. Thus, the repetition frequency of the output light pulse is made equal to the mode locking signal. This is generally referred to as the pull-in effect. (For further details see: U. Uchida, A. Ueki "Self Locking of Gas Lasers," IEEE J. QE-3, No. 1, p. 17, Jan. 1967; W. R. Bennett, Jr. "Hole Burning Effects in a He-Ne Optical Maser," Phys. Rev., Vol 126, p. 580, Apr. 1962; W. R. Bennett, Jr. "Gaseous Optical Masers," Appl. Optics, supplement 1, p. 24, 1962).

In the prior art laser device of FIG. 1, however, it has been found that a phase deviation is developed between the mode locking signal and the output light.

Figure 4:
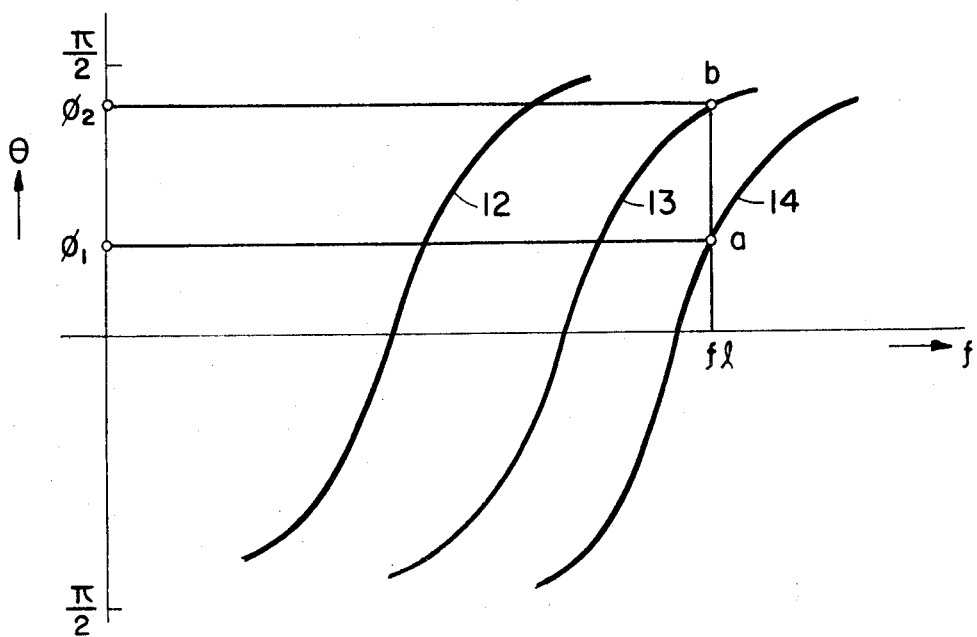
FIG. 4 illustrates the characteristic curves for describing the operation of the embodiment of FIG. 2.

This can be described by referring to FIG. 4 in which the frequency $f$ of the mode locking signal is plotted along $fl$ the abscissa, and the phase deviation of the output pulse with respect to the mode locking signal is plotted along the ordinate. Curves 12, 13 and 14 illustrate the mode locking frequency vs. phase deviation characteristics respectively for a laser output of 300 mw., 500 mw. and 700 mw. Needless to say, the range of the mode locking signal frequency in which self-mode-locking is unaffected is rather limited. As will be seen from these curves, the phase of the light pulse is advanced for high mode locking signal frequencies. In contrast, when the frequency $f$ is decreased, the phase $\theta$ lags. Likewise, for a fixed mode locking signal frequency $fl$, the phase of the output light beam tends to advance with the decrease of the oscillation intensity. This is shown by the fact that the phase deviation $01$ for point $a$ on curve 14 is smaller than the deviation $02$ for point $b$ on curve 13. (For a theoretical analysis of this phonomenon, see T. Uchida: "Dynamic Behavior of Gas Lasers," IEEEJ., QE-3, No. 1 p.7, Jan. 1967). This shows that a very limited variation of oscillation intensity due to internal loss appreciably affects the phase of the light pulse output. Therefore, if the reflecting mirror is slightly misaligned with respect to the optical axis of the laser due, for example, to ambient temperature change or degradation in the reflection factor of the reflecting mirrors due to dust fallout, the phase of the output light pulse is greatly affected.

This invention is therefore based on the phase control of the mode locking signal carried out so that it follows the change in the phase of the output light pulse.

Figure 2:
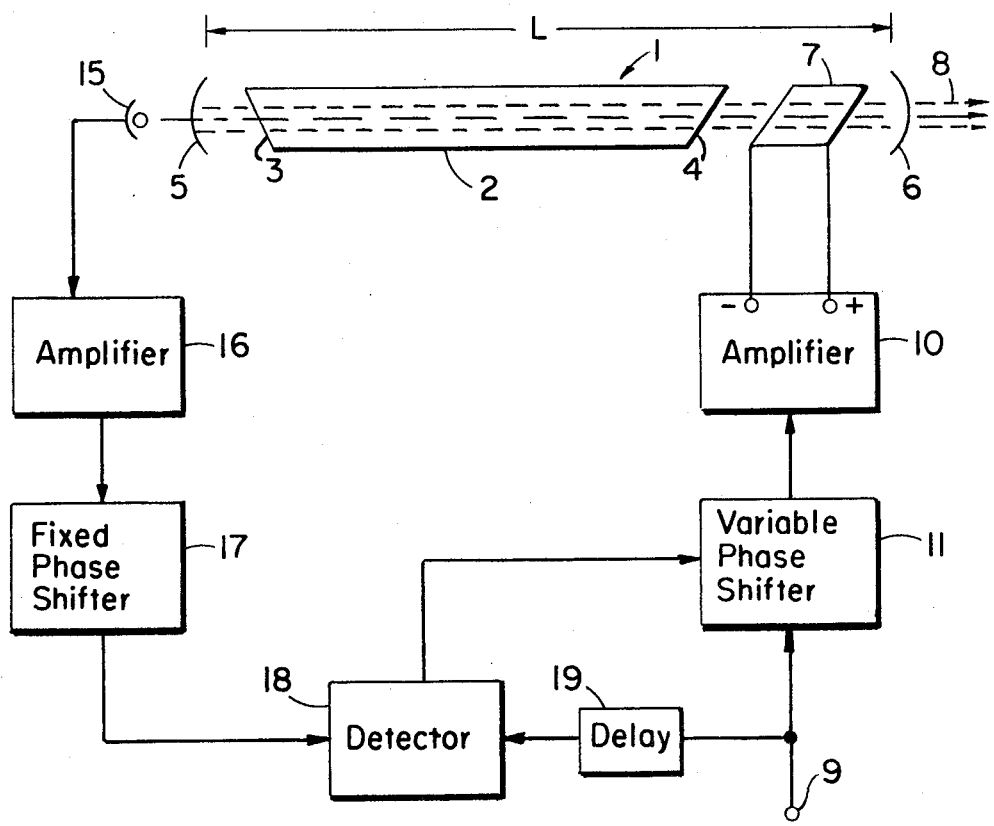
FIG. 2 is a schematic diagram of a laser device according to an embodiment of this invention.

Referring to the embodiment of the invention depicted schematically in FIG. 2, a variable phase shifter 11, consisting of a variable capacitance diode or the like, is interposed between mode locking signal input terminal 9 and amplifier 10. The oscillation output of the laser through mirror 5 is envelope-detected by a photodiode 15 placed adjacent mirror 5 into an electrical signal. The transparency of mirror 5 is sufficiently small so as not to affect the laser oscillation and may be, for example, as low as 0.1 percent. The detected output of photodiode 15 is amplified by a VHF band amplifier 16 and is then applied to a fixed phase shifter 17 which provides a certain definite phase shift. Phase shifter 17 may consist of lumped constant circuit elements such as inductive and capacitive elements. The phase-shifted detected output is supplied to a phase detector 18, to which a portion of the mode locking signal is supplied from terminal 9 through a delay means 19.

Phase detector 18 detects the phase difference $\theta$ between the incoming mode locking signal and the output light pulse. The extremely low frequency output voltage of detector 18 is proportional to cos $\theta$. In this case, the phase shift to be brought about by fixed phase shifter 17 is determined so that the phase difference between the two signals applied to phase detector 18 may be 90°. The phase-comparison output of detector 18 is applied to the variable capacitance diode of variable phase shifter 11. The phase-controlled mode locking signal is sufficiently amplified by amplifier 10, and is applied to modulator 7. As will be seen, from the embodiment of FIG. 2 the phase of the locking signal is controlled so as to minimize the phase deviation of the output light pulse. Thus, the phase of the output light pulse is stabilized or forced to closely follow that of the mode locking signal. Delay line 19 is employed so that time relationship between the two outputs of phase shifter 17 and terminal 9 is regulated.

For the purpose of stabilizing the phase of the output light pulse, it may be conceived that the loss of oscillation is changed according to the variation of the detected phase. In other words, it may be considered that the output of the phase detector 18 is superimposed on the bias voltage of the internal modulator 7 in the prior art embodiment of FIG. 1. In this case, however, the output light pulse amplitude is also affected and, in some cases, the oscillation may become unstable. However, in the arrangement of this invention, as shown in FIG. 2, the laser oscillation itself is not affected at all, because only a portion of the oscillation is detected.

As is apparent from the foregoing description, this invention makes it possible to keep the laser output light pulse exactly in phase with the mode locking signal. This insures the maintenance of synchronism when the device is used for ultrahigh speed PCM transmission system.

Thus while only a single embodiment of the present invention has been herein specifically described it will be apparent that modifications may be therein without departing from the spirit and the scope of the invention.

We claim:

1. In a phase stabilized laser device for forced mode locking operation of a laser having a laser active material, a pair of reflecting mirrors each facing said laser active material, an internal optical modulator interposed between said laser active material and one of said pair of reflecting mirrors, and a source of a mode locking signal to be supplied to said optical modulator; the improvement which comprises: means for detecting the output light pulse of said laser, means coupled to said light detecting means for detecting the phase difference between the detected light pulse and said mode locking signal, and means disposed between said mode locking signal source and said optical modulator for variably controlling the phase of said mode locking signal in response to the output of said phase difference detecting means.

2. The improvement of claim 1, further comprising fixed phase difference shifting means operatively interposed between said light detecting means and said phase detecting means.

3. The improvement of claim 1, further comprising means coupled to said source for regulating the time relationship between the output of said phase shifting means and said source.

4. The improvement of claim 3, in which said time regulating means comprises delay means coupled between said source and said phase detecting means.

* * * * *

UNITED STATES PATENT OFFICE
CERTIFICATE OF CORRECTION

Patent No. 3,651,424  Dated March 21, 1972

Inventor(s) Yoshito Ueno and Youichi Matsumoto

It is certified that error appears in the above-identified patent and that said Letters Patent are hereby corrected as shown below:

Column 4, Claim 2, line 32, "difference" should not have been printed;

line 33, "phase detecting" should have been -- phase difference detecting --.

Signed and sealed this 1st day of August 1972.

(SEAL)
Attest:

EDWARD M. FLETCHER, JR.
Attesting Officer

ROBERT GOTTSCHALK
Commissioner of Patents